(12) United States Patent
Lin et al.

(10) Patent No.: US 8,950,685 B1
(45) Date of Patent: Feb. 10, 2015

(54) STYLIZED QR CODE GENERATING APPARATUS AND METHOD THEREOF

(71) Applicant: National Taiwan University, Taipei (TW)

(72) Inventors: Yi-Shan Lin, Taipei (TW); Sheng-Jie Luo, Taipei (TW); Bing-Yu Chen, Taipei (TW)

(73) Assignee: National Taiwan University, Taipei (TW)

( * ) Notice: Subject to any disclaimer, the term of this patent is extended or adjusted under 35 U.S.C. 154(b) by 0 days.

(21) Appl. No.: 14/253,263

(22) Filed: Apr. 15, 2014

(30) Foreign Application Priority Data

Dec. 13, 2013 (TW) .............................. 102146032 A (51) Int. Cl.
*G06K 19/06* (2006.01)
*G06K 5/02* (2006.01)

(52) U.S. Cl.
CPC ........................................ *G06K 5/02* (2013.01)
USPC ....................................................... 235/494

(58) Field of Classification Search
CPC ............ G06K 19/06037; G06K 19/06; G06K 19/06056; G06T 11/60
USPC .......... 235/435, 436, 437, 462.01, 462.1, 494
See application file for complete search history.

(56) References Cited

U.S. PATENT DOCUMENTS

| | | | |
|---|---|---|---|
| 7,520,443 B2 * | 4/2009 | Kamijoh et al. .............. | 235/494 |
| 8,783,571 B2 * | 7/2014 | Sakahashi et al. ....... | 235/462.01 |
| 2009/0255992 A1 * | 10/2009 | Shen .......................... | 235/462.1 |
| 2013/0026241 A1 * | 1/2013 | Sakahashi et al. ............ | 235/494 |

OTHER PUBLICATIONS

Lin et al., "Artistic QR Code Embellishment", The 21st Pacific Conference on Computer Graphics and Applications (Pacific Graphics), vol. 32, No. 7 (2013).

\* cited by examiner

*Primary Examiner* — Seung Lee
(74) *Attorney, Agent, or Firm* — Mintz Levin Cohn Ferris Glovsky and Popeo, P.C.; Peter F. Corless; Steven M. Jensen (57) ABSTRACT

A stylized QR code generating apparatus is provided, which includes: an image adjusting module having an image detecting unit and a shape distorting unit; and a code stylizing module having a boundary matching unit and a boundary adjusting unit. The image detecting unit detects an error value generated in a QR code when a predetermined image is embedded in the QR code, and the shape distorting unit distorts a plurality of meshes converted from the image to adjust a shape of the image and thereby correct the error value in the QR code. The boundary matching unit matches a plurality of first boundary sections of the QR code with second boundary sections of a predetermined pattern, and the boundary adjusting unit adjusts the first boundary sections to the matched second boundary sections, respectively.

13 Claims, 13 Drawing Sheets

STYLIZED QR CODE GENERATING APPARATUS AND METHOD THEREOF

CROSS-REFERENCES TO RELATED APPLICATIONS

This application claims under 35 U.S.C. §119(a) the benefit of Taiwanese Application No. 102146032, filed Dec. 13, 2013, the entire contents of which is incorporated herein by reference.

BACKGROUND OF THE INVENTION

1. Field of the Invention

The present invention relates to techniques of generating quick response code (QR code), and more particularly, to an apparatus and method of generating stylized QR code.

2. Description of Related Art

QR codes are two-dimensional barcodes containing coding information. Since QR codes have advantages of low cost, mass data storage capacity and instant access, they have become one of the most-used types of barcodes nowadays.

QR codes on broadcast media, such as magazines or displays, can be conveniently read by a smart phone with a QR code reader. Therefore, a QR code can be used by an advertising company or a marketing department of a company for marketing, such that customers can quickly access a website of the company via the QR code.

Although the QR code is used almost everywhere, a typical QR code is merely comprised of white and black pixels in a square frame, such that it is difficult for people to understand information contained in a QR code without a QR code reader.

Currently, QR codes having special images are printed or displayed on business cards, posters or billboards to make them more attractive and recognizable, which, however, increases an error value in the QR codes and consequently makes it difficult for a QR code reader to read the QR codes.

Therefore, how to overcome the above-described drawbacks has become urgent.

SUMMARY OF THE INVENTION

In view of the above-described drawbacks, the present invention provides a stylized QR code generating apparatus, which comprises: an image adjusting module and a code stylizing module. The image adjusting module has an image detecting unit and a shape distorting unit, the image detecting unit detects an error value generated in a QR code when a predetermined image is embedded in the QR code, and the shape distorting unit distorts a plurality of meshes converted from the image to adjust a shape of the image and thereby correct the error value in the QR code. The code stylizing module has a boundary matching unit and a boundary adjusting unit, the boundary matching unit matches a plurality of first boundary sections of the QR code with second boundary sections of a predetermined pattern, and the boundary adjusting unit adjusts the first boundary sections to the matched second boundary sections, respectively.

The present invention further provides a method of generating stylized QR code, which comprises the steps of: detecting an error value generated in a QR code when a predetermined image is embedded in the QR code; distorting a plurality of meshes converted from the image to adjust a shape of the image and thereby correct the error value in the QR code; matching a plurality of first boundary sections of the QR code with second boundary sections of a predetermined pattern; and adjusting the first boundary sections to the matched second boundary sections, respectively.

Therefore, by detecting an error value generated in a QR code when a predetermined image is embedded in the QR code with the image detecting unit, adjusting the shape of the image through a plurality of meshes to correct the error value in the QR code, the present invention allows the image to be embedded in the QR code with a reduced error value. Further, by matching a plurality of first boundary sections of the QR code with second boundary sections of a predetermined pattern and adjusting the first boundary sections to the matched second boundary sections, respectively, the present invention provides the QR code with different styles and characteristics. Therefore, the present invention improves the attractiveness and recognizability of the QR code and increases the QR code reading capability and reading accuracy of a QR code reader.

BRIEF DESCRIPTION OF DRAWINGS

FIGS. 2A to 3D are schematic diagrams showing a stylized QR code generating method of the present invention;

DETAILED DESCRIPTION OF PREFERRED EMBODIMENTS

The following illustrative embodiments are provided to illustrate the disclosure of the present invention, these and other advantages and effects can be apparent to those in the art after reading this specification.

It should be advised that the structure, ratio, and size as illustrated in this context are only used for disclosures of this specification, provided for persons skilled in the art to understand and read, and technically do not have substantial meaning. Any modification of the structure, change of the ratio relation, or adjustment of the size should be involved in the scope of disclosures in this specification without influencing the producible efficacy and the achievable objective of this specification.

Further, terms such as "first", "second", "on", "a" etc. are merely for illustrative purposes and should not be construed to limit the scope of the present invention. Those changes or adjustments of relative relationship without substantial change of technical content should also be considered within the category of implementation.

Figure 1:
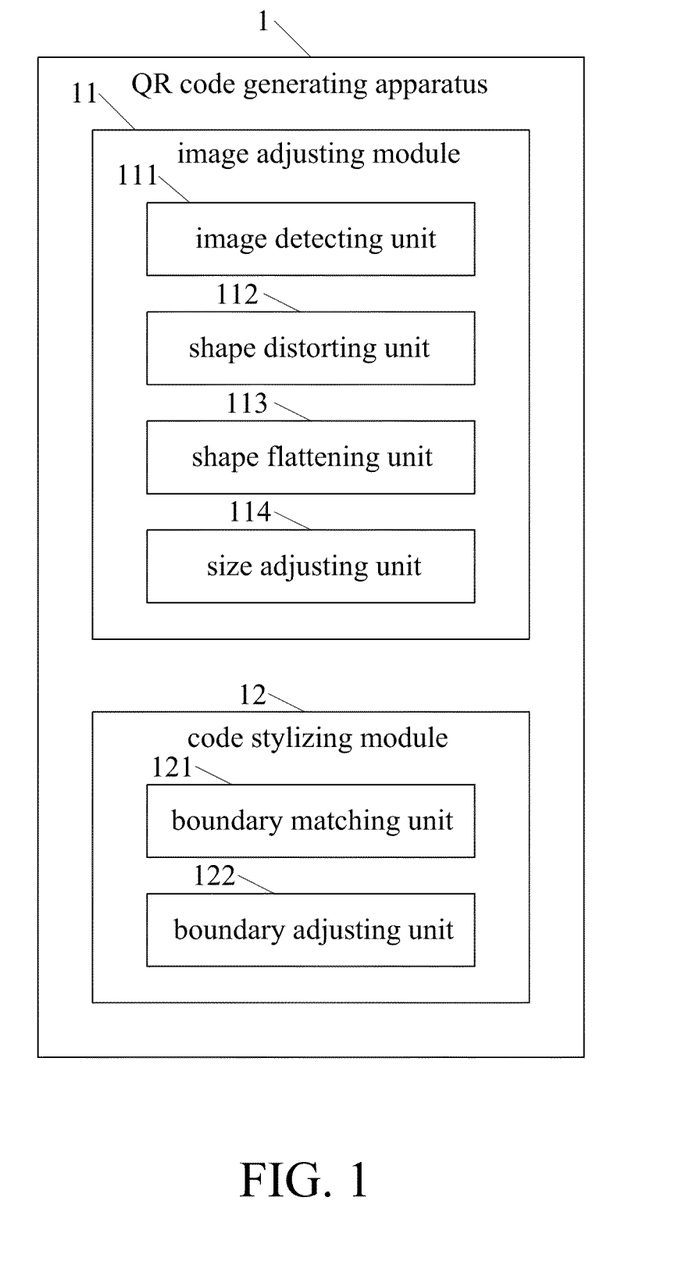
FIG. 1 is a schematic block diagram of a stylized QR code generating apparatus of the present invention.

FIG. 1 is a schematic block diagram of a stylized QR code generating apparatus 1 of the present invention. FIGS. 2A to 3D are schematic diagrams showing a stylized QR code generating method of the present invention.

Referring to FIG. 1, the QR code generating apparatus 1 comprises an image adjusting module 11 and a code stylizing module 12. The image adjusting module 11 has an image detecting unit 111, a shape distorting unit 112, a shape flattening unit 113 and a size adjusting unit 114. The code stylizing module 12 has a boundary matching unit 121 and a boundary adjusting unit 122.

Referring to FIG. 1 and FIGS. 2A to 2B-5, the image detecting unit 111 detects an error value generated in a QR code 13 when a predetermined image 14 is embedded in the QR code 13.

Figure 2A:
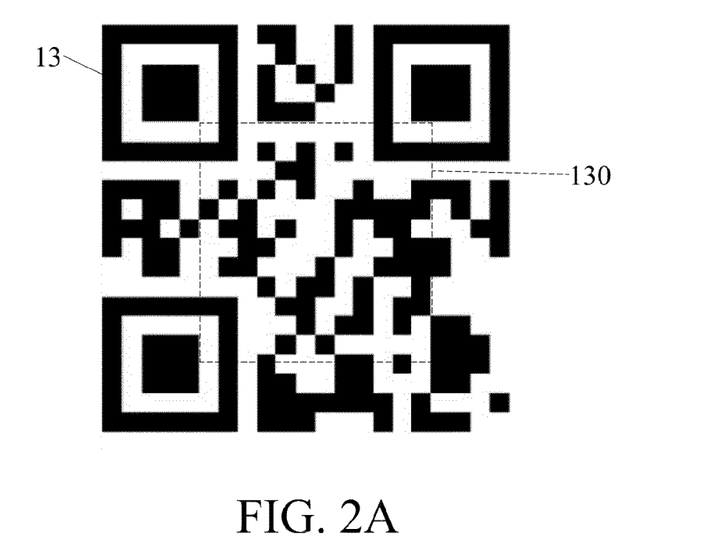
Figure 2B:
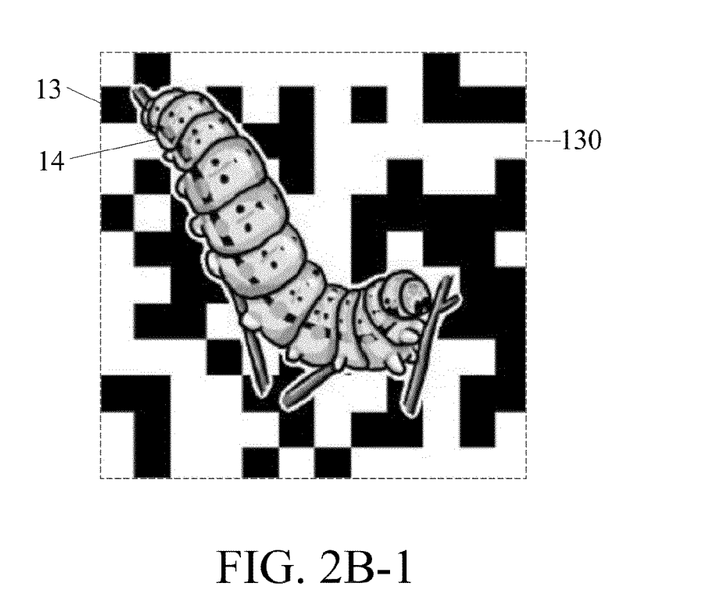
Figure 2B:
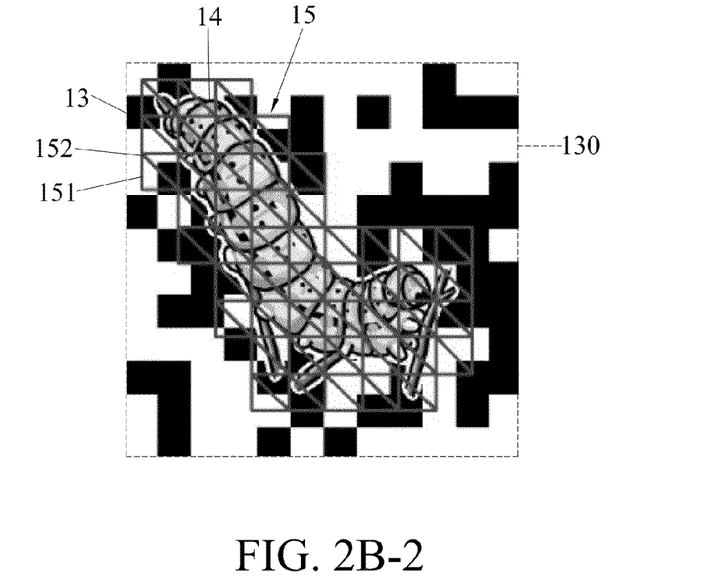

In particular, in a method of generating the stylized QR code of the present invention, the QR code 13 as shown in FIG. 2A is provided, and the image 14 as shown in FIG. 2B-1 is embedded in a region 130 or other regions of the QR code 13 of FIG. 2A. Then, a plurality of meshes 15 are converted from the image 14 and the shape thereof, as shown in FIG. 2B-2. The meshes 15 consist of a plurality of interconnected triangles 151 and vertices 152.

Figure 2B:
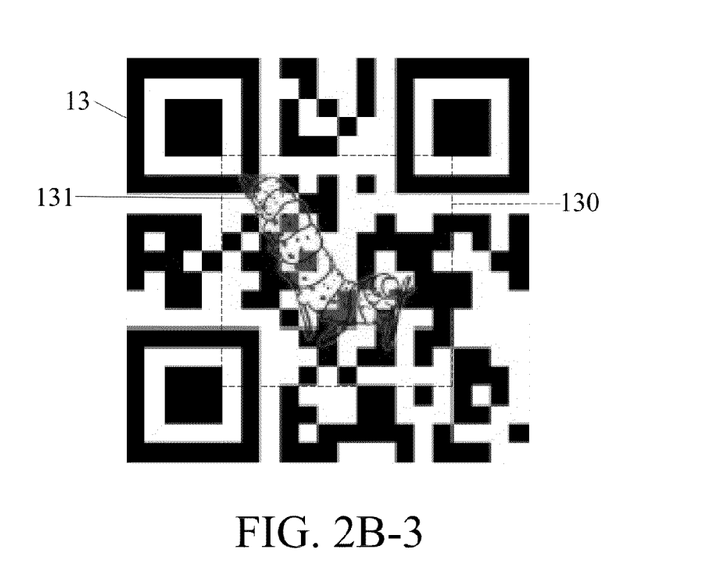
Figure 2B:
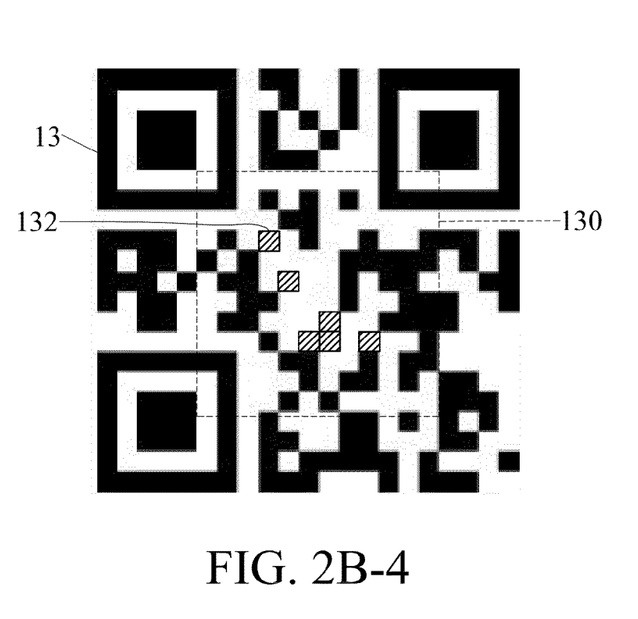
Figure 2B:
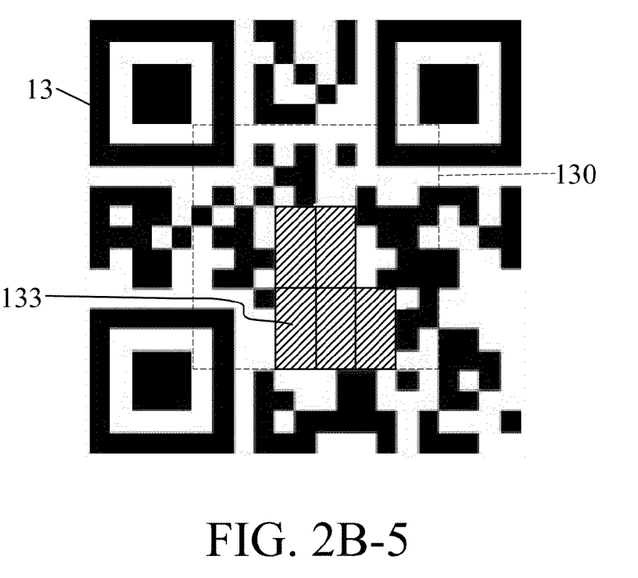
Figure 2C:
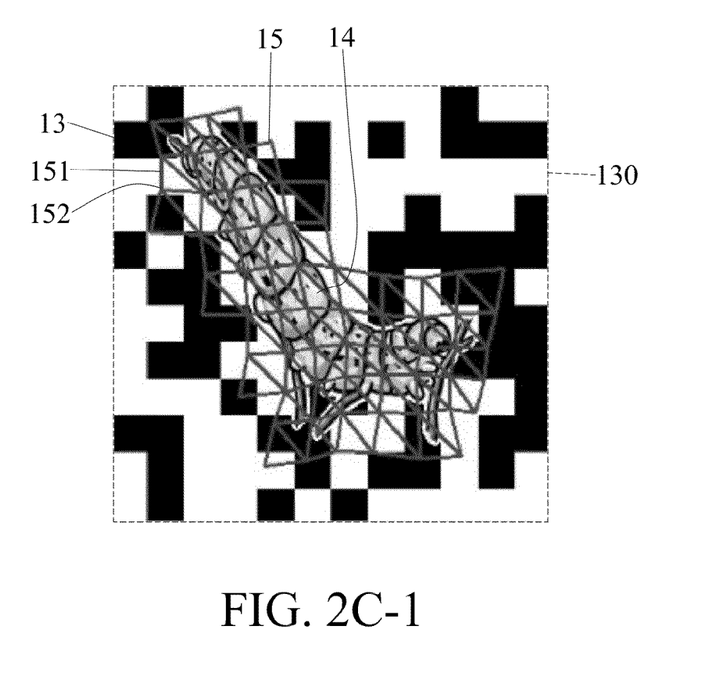
Figure 2C:
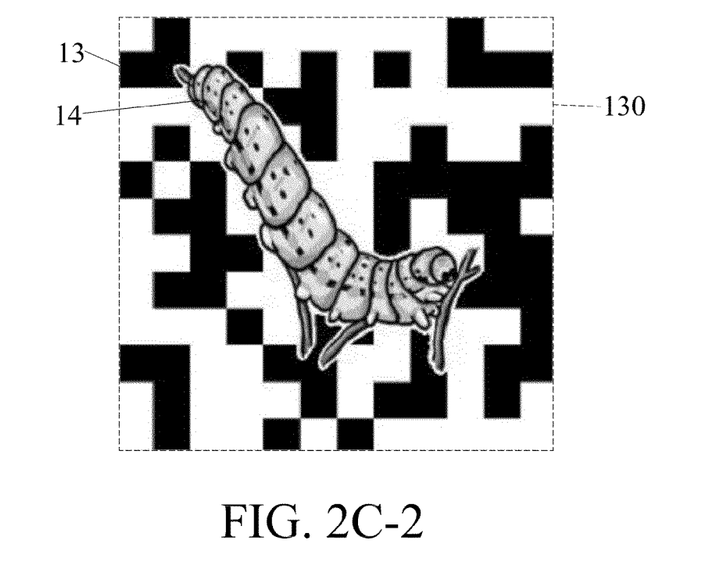
Figure 2C:
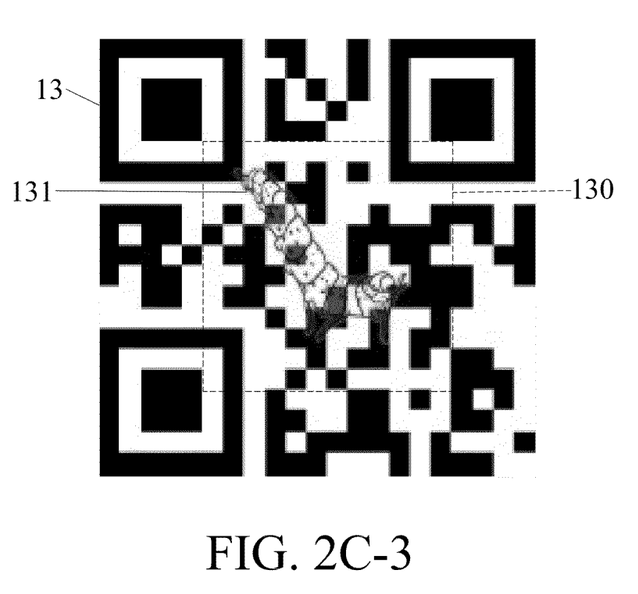
Figure 2C:
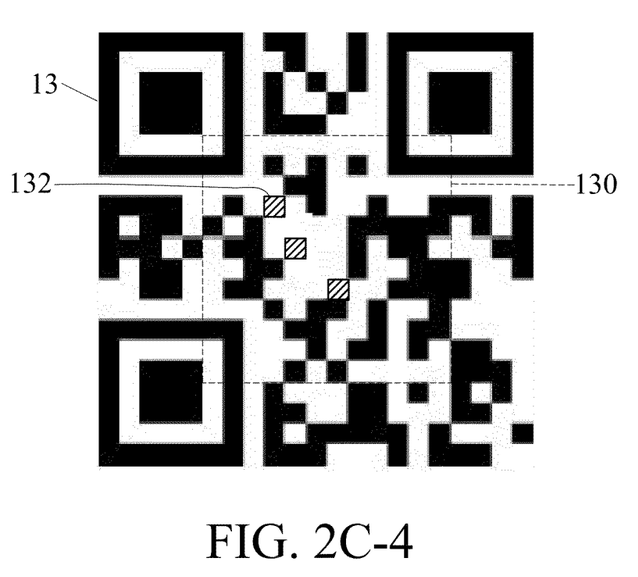
Figure 2C:
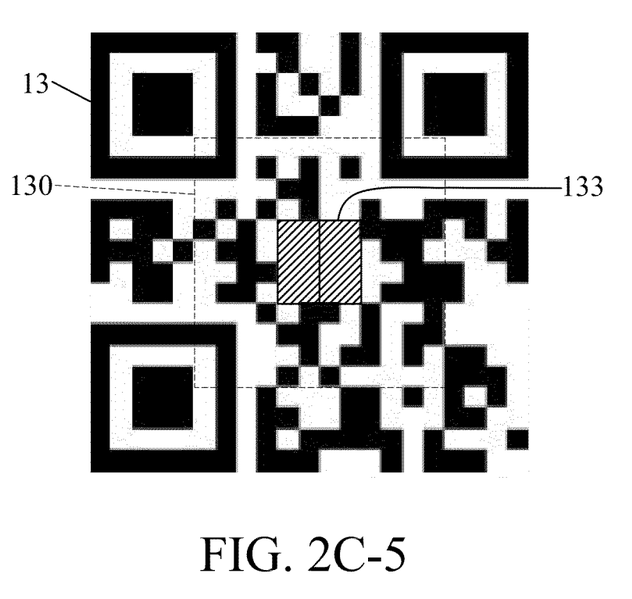

Subsequently, the image detecting unit 111 detects the error value generated in the QR code 13 when the image 14 is embedded in the QR code 13. After comparison or calculation, if the image 14 in the QR code 13 is different in pixel color, module color or codeword color from the original QR code 13, it can be determined that the pixel color, module color or codeword color is an error value. Also, the error value can be categorized as a value of pixel error 131 (as shown in FIG. 2B-3), a value of module error 132 (as shown in FIG. 2B-4) or a value of codeword error 133 (as shown in FIG. 2B-5) in the QR code 13.

In the present embodiment, the value of module error 132 of FIG. 2B-4 is 6, and the value of codeword error 133 of FIG. 2B-5 is 5. That is, when the image 14 is embedded in the QR code 13, six module errors 132 or five codeword errors 133 are generated in the QR code 13.

Referring to FIG. 1 and FIGS. 2C-1 to 2C-5, the shape distorting unit 112 distorts a plurality of meshes 15 converted from the image 14 so as to adjust a shape of the image 14.

In particular, in the method of generating stylized QR code of the present invention, the shape distorting unit 112 adjusts shapes and edge lengths of the triangles 151 and positions of the vertices 152 of meshes as shown in FIG. 2B-2, so as to distort or adjust a shape constituted by the meshes 15 to a shape of meshes as shown in FIG. 2C-1. As such, the image 14 as shown in FIG. 2B-1 is distorted or adjusted to image 14 as shown in FIG. 2C-2.

Further, in the method of generating stylized QR code of the present invention, the shape flattening unit 113 adjusts smoothness of edge lines connected by edges of the meshes 15 to thereby adjust the shape of the image 14. Also, the size adjusting unit 114 adjusts size of the shape constituted by the meshes 15 to thereby adjust size of the image 14.

After the image 14 as shown in FIG. 2B-1 is adjusted to the image 14 of FIG. 2C-2, the image detecting unit 111 detects an error value generated by the distorted or adjusted image 14 in the QR code 13. The error value can be a value of pixel error 131 of FIG. 2C-3, a value of module error 132 of FIG. 2C-4, or a value of codeword error 133 of FIG. 2C-5.

In the present embodiment, the value of module error 132 of FIG. 2C-4 is 3 and the value of codeword error 133 of FIG. 2C-5 is 2. That is, the distorted or adjusted image 14 generates three module errors 132 or two codeword errors 133 in the QR code 13. Therefore, after distortion or adjustment, the image 14 generates a reduced error value in the QR code 13, thereby increasing the QR code reading capability and reading accuracy of a QR code reader.

Referring to FIG. 1 and FIGS. 3A to 3D, the boundary matching unit 121 matches a plurality of first boundary sections 134 of the QR code 13 with second boundary sections 161 of a pattern 16. The boundary adjusting unit 122 adjusts the first boundary sections 134 to the matched second boundary sections 161, respectively, thereby stylizing the QR code 13.

Figure 3A:
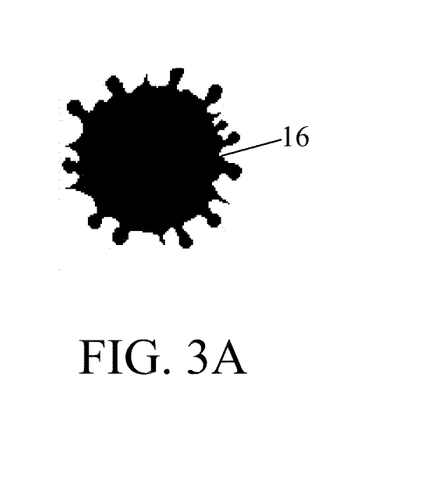
Figure 3B:
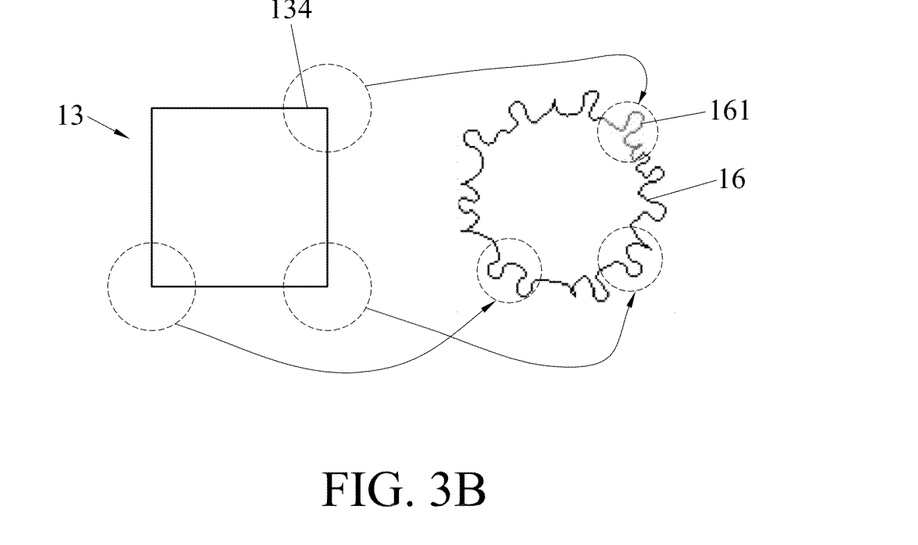

In particular, in the method of generating stylized QR code of the present invention, the pattern 16 of FIG. 3A is provided, and the boundary matching unit 121 allows all the first boundary sections 134 of the QR code 13 of FIG. 2A being matched or corresponded with the suitable second boundary sections 161 of the pattern 16 of FIG. 3B, respectively.

Figure 3C:
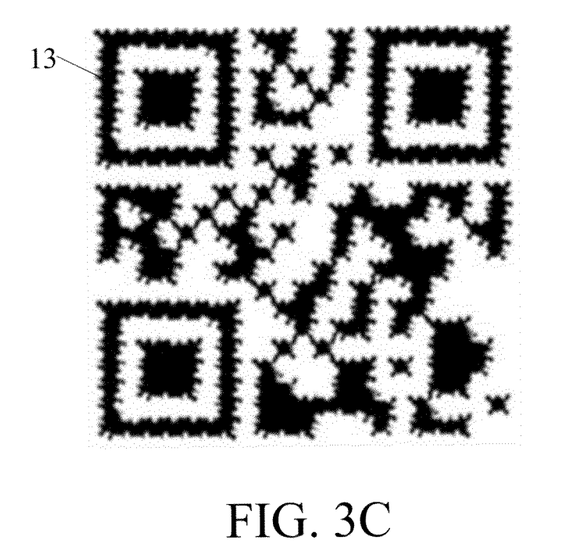

Then, the boundary adjusting unit 122 adjusts the first boundary sections 134 to the matched second boundary sections 161, respectively, thus adjusting the QR code 13 of FIG. 2A to a stylized QR code 13 of FIG. 3C.

Figure 3D:
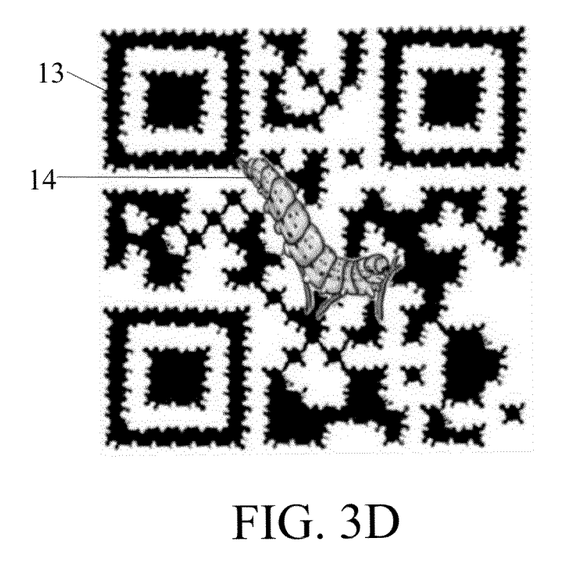

Thereafter, the distorted or adjusted image 14 of FIG. 2C-2 is combined with the stylized QR code 13 of FIG. 3C, so as to obtain a stylized QR code 13 having the image 14, as shown in FIG. 3D.

Figure 4:
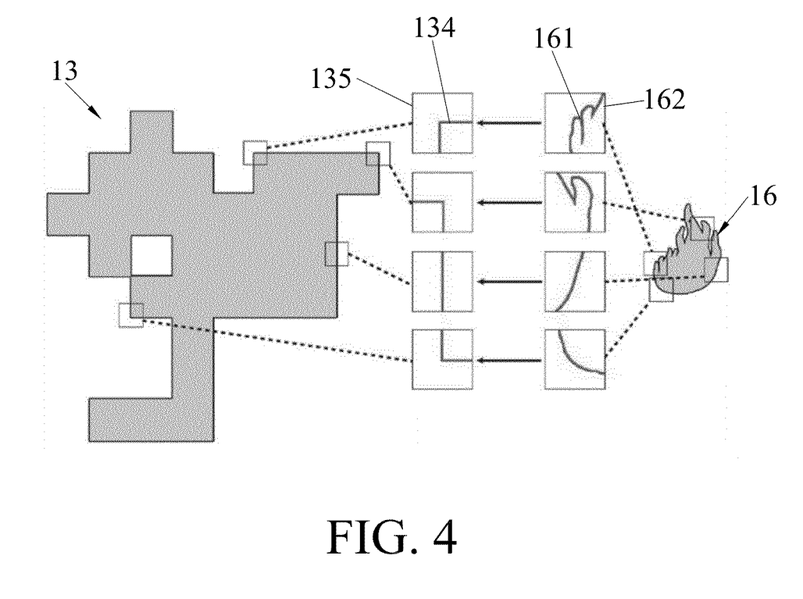
FIG. 4 is a schematic diagram showing an embodiment matching boundary sections of a QR code with boundary sections of a pattern according to the present invention.

FIG. 4 is a schematic diagram showing an embodiment matching boundary sections of a QR code with boundary sections of a pattern according to the present invention. The difference of the present method from the method of FIG. 3B is described as follows.

Referring to FIG. 4, a plurality of first boundary sections 134 of the QR code 13 are obtained through a plurality of first windows 135, respectively, and a plurality of second boundary sections 161 are obtained through a plurality of second windows 162, respectively. Then, the first boundary sections 134 are matched or corresponded to the most suitable second boundary sections 161, respectively.

FIGS. 5A to 5D are schematic diagrams showing an embodiment matching boundary sections of a QR code with most suitable boundary sections of a pattern according to the present invention.

Figure 5A:
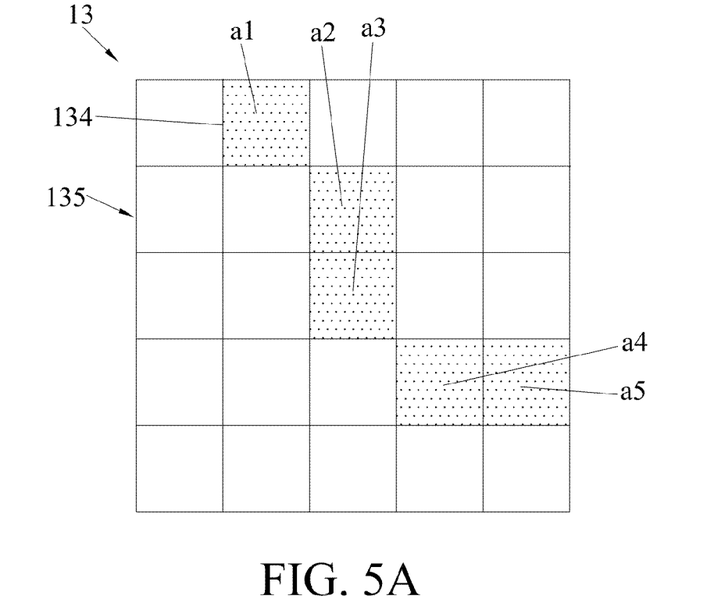
FIGS. 5A to 5D are schematic diagrams showing an embodiment matching boundary sections of a QR code with most suitable boundary sections of a pattern according to the present invention.
Figure 5B:
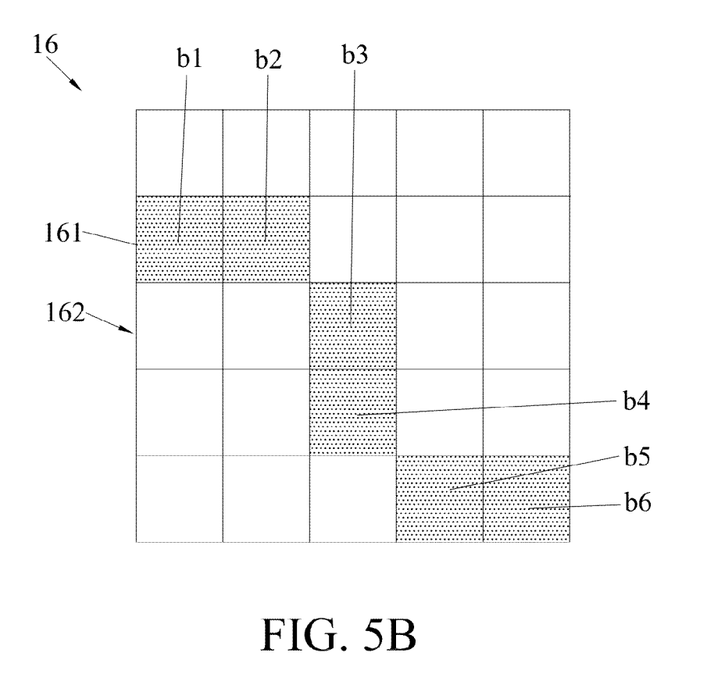

Referring to FIGS. 5A and 5B and FIG. 1, in a first window 135, one of a plurality of first boundary sections 134 of the QR code 13 has pixels a1 to a5, and in a second window 162, one of a plurality of second boundary sections 161 of the pattern 16 has pixels b1 to b6. The first window 135 of FIG. 5A is overlapped with the second window 162 of FIG. 5B, so as to obtain a window of FIG. 5C (or FIG. 5D). Then, the boundary matching unit 121 calculates distances between the pixels a1 to a5 of the first boundary sections 134 and adjacent pixels b1 to b6, respectively.

Figure 5C:
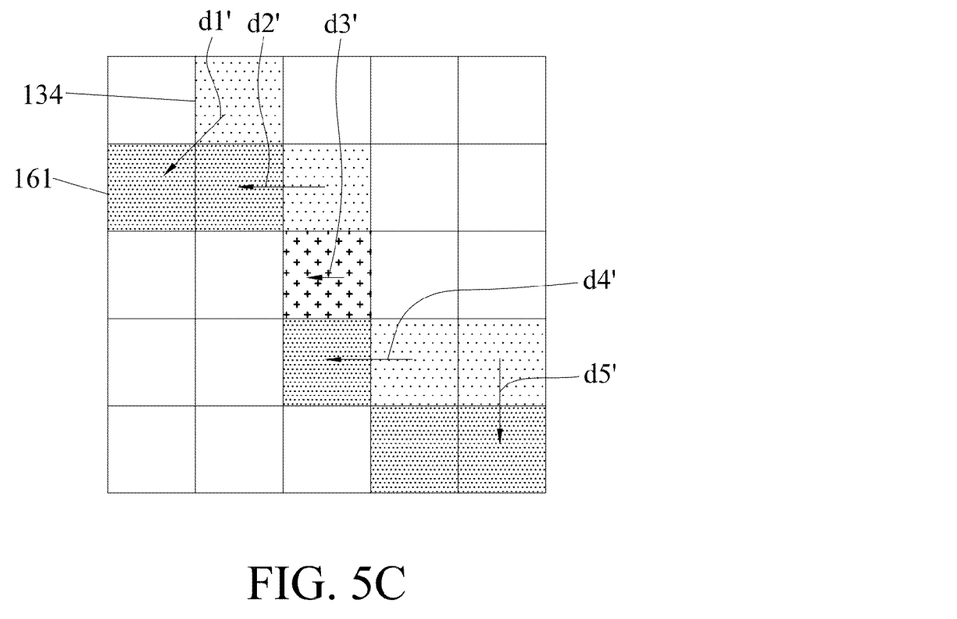
Figure 5D:
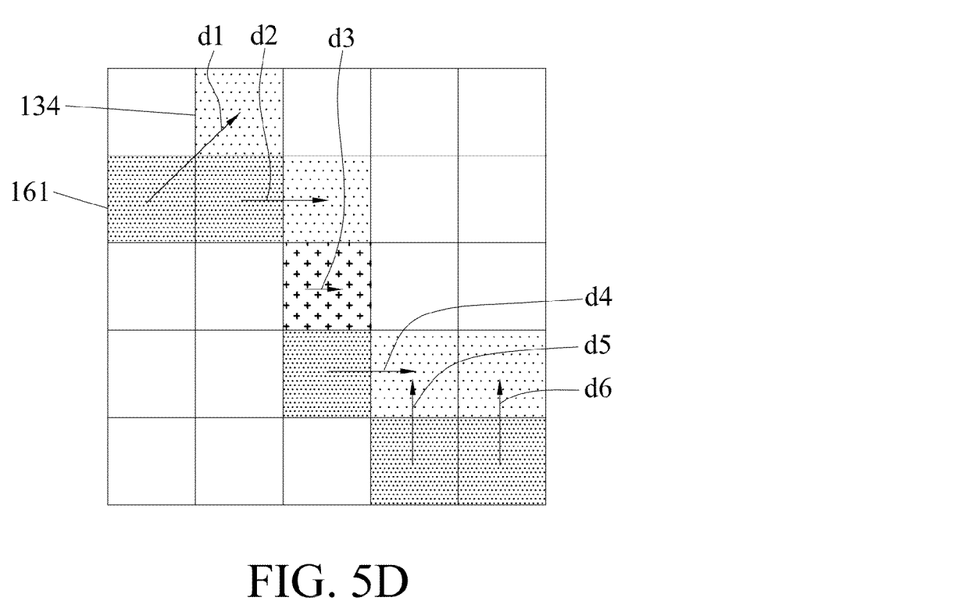

In the present embodiment, referring to FIG. 5C, the boundary matching unit 121 calculates the distance d1' from the pixel a1 to the pixel b1, the distance d2' from the pixel a2 to the pixel b2 . . . the distance d5' from the pixel a5 to the pixel b6. Referring to FIG. 5D, the boundary matching unit 121 further calculates the distance d1 from the pixel b1 to the pixel a1, the distance d2 from the pixel b2 to the pixel a2 . . . the distance d6 from the pixel b6 to the pixel a5. Further, the distances d1' to d5' and d1 to d6 are individually summed up and averaged. That is, the distance between the first boundary section 134 and the second boundary section 161 is calculated according to the following equation.

$$D(\mathcal{N}(p_m), \mathcal{N}(p_e)) = \frac{\sum_{p \in \mathcal{N}(p_m)} d(p, p')}{|\mathcal{N}(p_m)|} + \frac{\sum_{p \in \mathcal{N}(p_e)} d(q, q')}{|\mathcal{N}(p_e)|} = \frac{1}{5}\sum_{i=1}^{5} d'_i + \frac{1}{6}\sum_{i=1}^{6} d_i$$

In the present embodiment, $N(P_m)$ refers to positions of the pixel a1 to the pixel a5 of FIG. 5A, and $N(P_m)$ refers to positions of the pixel b1 to the pixel b6 of FIG. 5B.

Similarly, the boundary matching unit 121 individually calculates distances between the one of the first boundary sections 134 and other second boundary sections 161, and matches the one of the first boundary sections 134 with a second boundary section 161 having a minimum distance therefrom.

Figure 6:
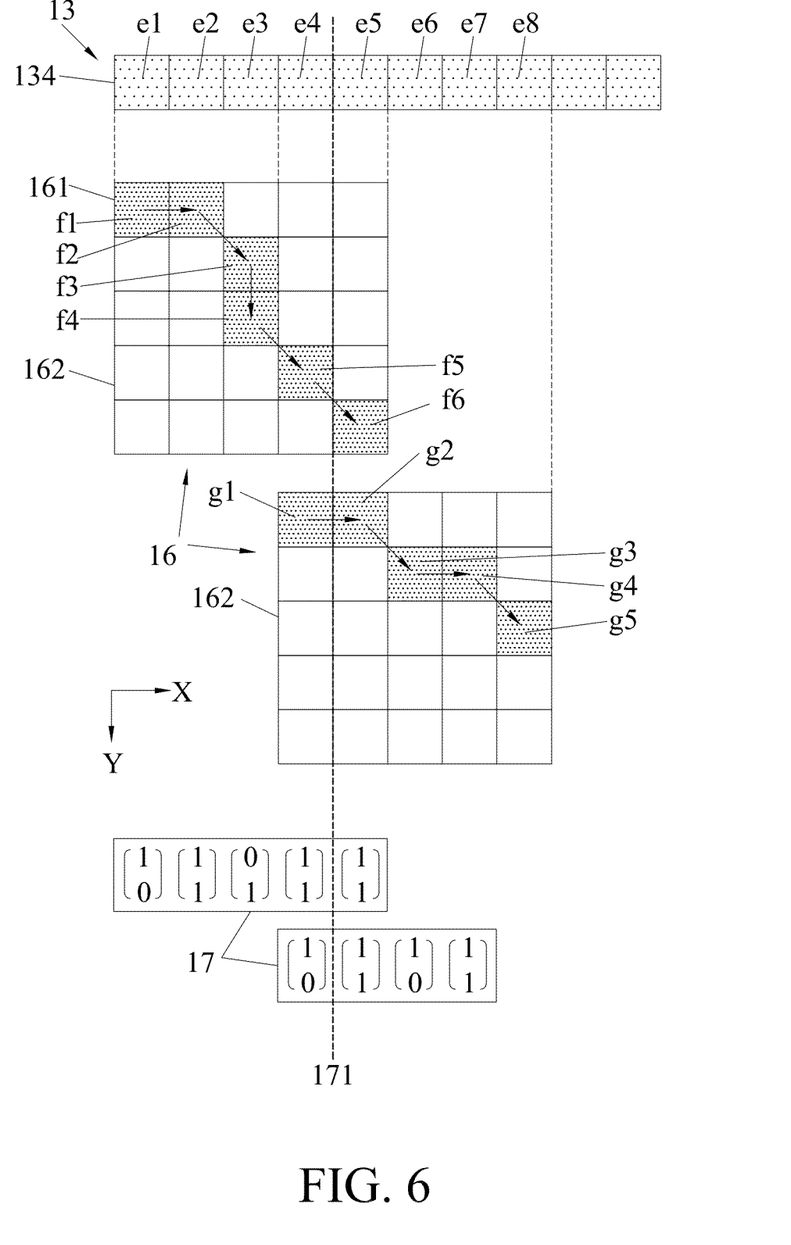
FIG. 6 is a schematic diagram showing an embodiment adjusting boundary sections of a QR code to boundary sections of a pattern according to the present invention.

FIG. 6 is a schematic diagram showing an embodiment adjusting boundary sections of a QR code to the matched boundary sections of a pattern according to the present invention.

Referring to FIGS. 1 and 6, a plurality of first boundary sections 134 of the QR code 13 has pixels e1, e2, . . . , e8 etc., and the most suitable second boundary sections 161 are matched with the first boundary sections 134 according to the above-described method and equation. As such, the boundary adjusting unit 122 individually calculates relative position of each pixel of the second boundary sections 161 and adjusts the positions of pixels of the second boundary sections 161 according to positions of pixels of the first boundary sections 134.

In the present embodiment, the boundary matching unit 121 individually calculates the relative position of each pixel to an adjacent pixel on X and Y axes. According to the calculation, the relative position from pixel f1 to pixel f2 is [1,0], the relative position from pixel f2 to pixel f3 is [1,1], . . . , and the relative position from pixel g4 to pixel g5 is [1,1], thereby obtaining an array 17 of FIG. 6.

The boundary matching unit 121 connects two pixels of adjacent second boundary sections 161 according to a cutting line 171. For example, the boundary matching unit 121 connects the pixels f6 and pixel g2, so as to connect two adjacent second boundary sections 161.

The boundary matching unit 121 can also use some pixels of the first boundary sections 134 as reference points and adjust positions of pixels of the second boundary sections 161 according to positions of the reference points. For example, by using the pixel e5 of the first boundary sections 134 as a reference point, the pixel f6 of the second boundary sections 161 is adjusted to the same position of the pixel e5, and other pixels f1 to f5 and pixels g1 to g5 are accordingly adjusted to suitable positions according to the adjusted position of the pixel f6.

The present invention detects an error value in a QR code when a predetermined image is embedded in the QR code with the image detecting unit and adjusts the shape of the image through a plurality of meshes to correct the error value in the QR code, thus allowing the image to be embedded in the QR code with a reduced error value. Further, by matching a plurality of first boundary sections of the QR code with second boundary sections of a predetermined pattern and adjusting the first boundary sections to the matched second boundary sections, respectively, the present invention provides the QR code with different styles and characteristics. Therefore, the present invention improves the attractiveness and recognizability of the QR code and increases the QR code reading capability and reading accuracy of a QR code reader.

The above-described descriptions of the detailed embodiments are only to illustrate the preferred implementation according to the present invention, and it is not to limit the scope of the present invention. Accordingly, all modifications and variations completed by those with ordinary skill in the art should fall within the scope of present invention defined by the appended claims.

What is claimed is:

1. A stylized quick response (QR) code generating apparatus, comprising:

an image adjusting module having an image detecting unit and a shape distorting unit, wherein the image detecting unit detects an error value generated in a QR code when a predetermined image is embedded in the QR code, and the shape distorting unit distorts a plurality of meshes converted from the predetermined image to adjust a shape of the predetermined image and thereby correct the error value in the QR code; and a code stylizing module having a boundary matching unit and a boundary adjusting unit, wherein the boundary matching unit matches a plurality of first boundary sections of the QR code with a plurality of second boundary sections of a predetermined pattern, and the boundary adjusting unit adjusts the first boundary sections to the matched second boundary sections, respectively.

2. The apparatus of claim 1, wherein the image adjusting module further has a shape flattening unit for adjusting smoothness of edge lines constituted by edges of the meshes to thereby adjust the shape of the predetermined image.

3. The apparatus of claim 1, wherein the image adjusting module further has a size adjusting unit for adjusting size of a shape constituted by the meshes to thereby adjust size of the predetermined image.

4. The apparatus of claim 1, wherein the image detecting unit detects an error value in the QR code before and after adjusting the predetermined image, the error value comprising a value of pixel error, a value of module error or a value of codeword error.

5. The apparatus of claim 1, wherein the meshes are comprised of a plurality of interconnected triangles and vertices, and the shape distorting unit adjusts edge lengths of the triangles and positions of the vertices to distort a shape constituted by the meshes and hence adjust the shape of the image.

6. The apparatus of claim 1, wherein the boundary matching unit individually calculates distances between the first boundary sections and the second boundary sections, so as to match each of the first boundary sections with a second boundary section having a minimum distance therefrom, respectively.

7. The apparatus of claim 1, wherein the boundary adjusting unit individually calculates pixel positions of the second boundary sections, and adjusts the pixel positions of the second boundary sections according to pixel positions of the first boundary sections.

8. A method of generating stylized QR code, comprising the steps of:

detecting an error value generated in a QR code when a predetermined image is embedded in the QR code;

distorting a plurality of meshes converted from the predetermined image to adjust a shape of the image and thereby correct the error value in the QR code;

matching a plurality of first boundary sections of the QR code with a plurality of second boundary sections of a predetermined pattern; and adjusting the first boundary sections to the matched second boundary sections, respectively.

9. The method of claim 8, further comprising adjusting smoothness of edge lines connected by edges of the meshes to thereby adjust the shape of the predetermined image.

10. The method of claim 8, further comprising adjusting size of a shape constituted by the meshes to thereby adjust size of the predetermined image.

11. The method of claim 8, wherein the error value is a value of pixel error, a value of module error or a value of codeword error in the QR code before or after adjusting the predetermined image.

12. The method of claim 8, further comprising individually calculating distances between the first boundary sections and the second boundary sections, so as to match each of the first boundary sections with a second boundary section having a minimum distance therefrom, respectively.

13. The method of claim 8, further comprising individually calculating pixel positions of the second boundary sections, and adjusting the pixel positions of the second boundary sections according to pixel positions of the first boundary sections.

* * * * *